Patented Jan. 17, 1928.

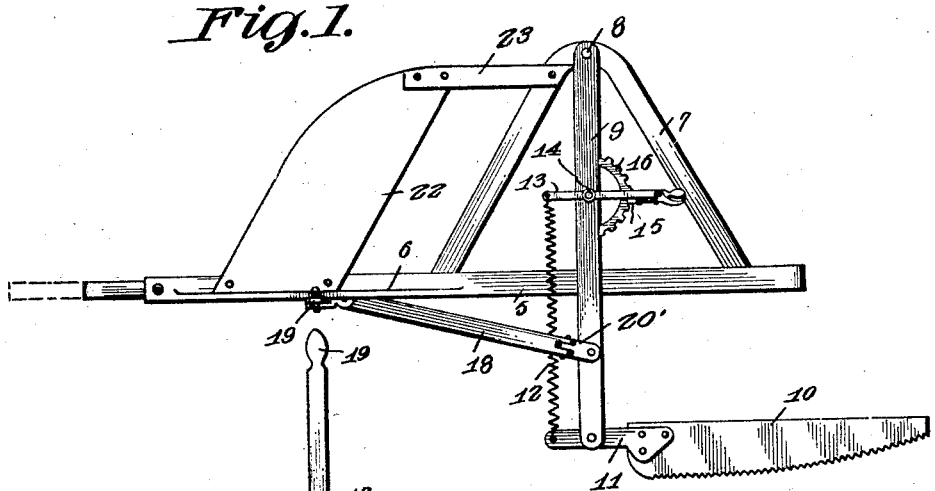
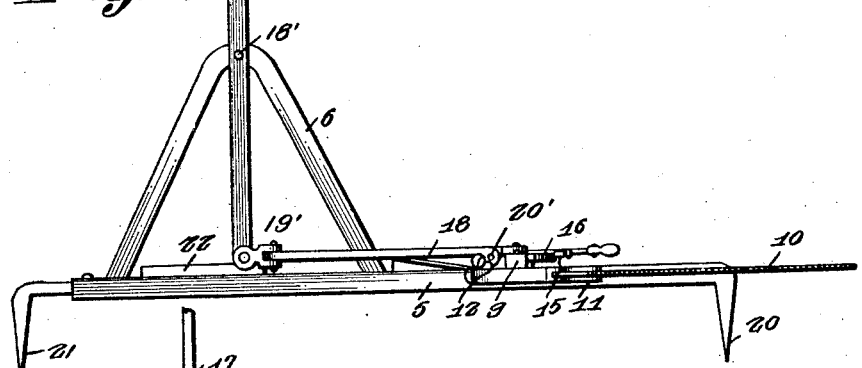
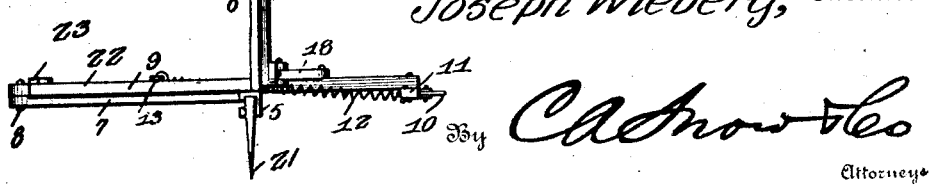

1,656,490

UNITED STATES PATENT OFFICE.

JOHN A. LUETKEMEYER AND JOSEPH WIEBERG, OF ST. ELIZABETH, MISSOURI.

SAW.

Application filed January 8, 1925. Serial No. 1,246.

This invention has reference to saws especially designed for sawing trees or the like in the clearing of ground.

An important object of the invention is to provide a device of this character wherein a relatively long saw may be efficiently operated by a single person.

Another object of the invention is to provide means for regulating the pressure exerted on the saw blade for urging the saw blade through its work.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a plan view of a saw device constructed in accordance with the invention.

Figure 2 is a side elevational view thereof.

Figure 3 is a rear elevational view thereof.

Referring to the drawing in detail, the device includes a supporting beam 5 on which is formed the supporting member 6 including angularly disposed supporting arms which extend upwardly therefrom. Extending laterally from the supporting beam 5 is a supporting member including angular supporting arms 7 that provide a support for the beam 9 that has pivotal connection with the supporting member at 8.

Pivotally mounted at the opposite end of the saw beam 9 is the saw 10 which has a supporting section 11 that extends rearwardly from the beam 9 where it is provided with an eye to accommodate one end of the coiled spring 12, the opposite end of the coiled spring 12 having connection with the lever 13 which is pivotally mounted on the saw beam 9 at 14. This lever 9 is provided with a suitable locking pin 15 adapted to engage the segment 16 so that it may be held in various positions of adjustment to tension the spring 12 for varying the degree of pressure on the saw 10.

The operating lever 17 has pivotal connection with the supporting member 6 at 18' and has its lower end connected with the arm 18 by means of the knuckle 19', the arm 18 also having connection with the saw beam 9, by means of the universal connection 20'. The upper end of the lever 17 is formed into a handle 19 which may be grasped by the operator and reciprocated to accomplish the purpose of the invention.

As clearly shown by Figure 2 of the drawing, the forward end of the beam 5 is provided with an inwardly extended prong 20, while the opposite end of the beam is hollow to adjustably support the prong 21 so that the device may be readily anchored by forcing the prongs 20 into the ground surface.

The weight of the operator also assists in holding the frame of the saw against movement and to this end, a platform 22 is provided which is shown as having one end thereof secured to the supporting beam 5 while the opposite end is anchored to one of the arms 7 by means of the bar 23. From the foregoing it will be obvious that, the operator may, by standing on the platform operate the lever 17 to impart a reciprocating movement to the saw blade 10.

We claim:—

A sawing device including a supporting beam having a downwardly extended forward end tapered to provide a prong, a laterally disposed frame on the beam, a saw beam pivotally mounted on the frame and resting on the beam, a saw pivotally connected to the free end of the bar, an arm pivotally connected with the bar adjacent to its outer end, an upstanding lever supporting frame mounted on the beam, a lever pivotally connected with the last mentioned bar for moving the bars and saw, and a coiled spring for normally urging the saw in one direction, and means for regulating the tension of the spring.

In testimony that we claim the foregoing as our own, we have hereto affixed our signatures.

JOHN A. LUETKEMEYER.
JOSEPH WIEBERG.